UNITED STATES PATENT OFFICE.

HEINRICH PRECHT, OF NEUSTASSFURT, GERMANY.

METHOD OF MAKING POTASSIUM HYDROXID.

SPECIFICATION forming part of Letters Patent No. 665,617, dated January 8, 1901.

Application filed July 23, 1900. Serial No. 24,620. (No specimens.)

*To all whom it may concern:*

Be it known that I, HEINRICH PRECHT, a subject of the King of Prussia, German Emperor, and a resident of Neustassfurt, Germany, have invented certain new and useful Improvements in and Relating to the Production of Potassium Hydrate; and I do hereby declare the following to be a full, clear, and exact description of the invention, such as will enable others skilled in the art to which it appertains to make and use the same.

This invention relates to a method for purifying potassium hydrate, and especially for separating from it potassium chlorid, which is a common impurity, especially when the hydrate has been produced electrolytically from the chlorid. The relative solubility of the base and salt forms the basis of separation. If a solution of potassium hydrate containing potassium chlorid be evaporated, the chlorid will separate out, leaving a solution containing fifty per cent. hydrate with 0.55 per cent. chlorid still in the solution. These figures correspond to solubilities at from 15° to 20° centigrade, and from this solution a product is obtained which contains for one hundred parts, by weight, of KOH about 1.10, by weight, of KCl. Such a product is not pure enough for some purposes, and the object is to obtain one of as high purity as possible.

From the above results it was thought that by using a solution of higher concentration—say, of sixty per cent. KOH—a more complete separation of the KCl could be obtained; but it was found that with such a concentration and the aid of recrystallization at normal temperature a more complete separation could not be obtained. A crystalline product was obtained which contained sixty-four per cent. KOH and 0.64 per cent. KCl, or for every one hundred parts, by weight, of KOH there remained one part, by weight, KCl. These figures differ very little from the previous values obtained from the fifty-per-cent. solution and are likewise unsatisfactory. In a similar manner purification by crystallization was carried out at 0° centigrade; but the result was equally unsatisfactory. After unfruitful experiments I attempted to separate the two substances by holding the chlorid in solution and crystallizing out the hydrate at higher temperatures, and although the solubility of potassium hydrate is greater at higher temperatures I succeeded. The desired separation can therefore be obtained as follows: An approximately fifty per cent. potassium-hydrate solution containing about 0.55 per cent. or half a per cent. of potassium chlorid as impurity is evaporated until the hydrate crystals begin to separate, when the solution is continually stirred, either by hand or in a mechanical stirrer, and then cooled to about 60° centigrade, whereby a rapid crystallization takes place. The crystals are then separated from the mother-liquor in any desired manner, as by a centrifugal machine, and washed with a small quantity of water. The temperature can be allowed to drop as low as 35° centigrade during the separation of the crystals from the mother-liquor without serious consequences; but below this temperature a high purification is not possible because of the separation of the chlorid. The resulting crystals contain about seventy per cent. KOH and 0.073 per cent. KCl, or in every one hundred parts, by weight, of KOH there will be 0.104 parts, by weight, of KCl. It is thus possible to operate on a commercial scale a process for purifying the hydrate from chlorid with results not heretofore obtained.

Having now particularly described my invention, what I claim as new, and desire to secure by Letters Patent, is—

1. The process which consists in evaporating a solution containing about fifty per cent. of potassium hydrate and about half a per cent. of potassium chlorid, allowing the crystals to separate out at about 60° centigrade and removing the crystals, substantially as described.

2. The process which consists in evaporating a solution containing about fifty per cent. of potassium hydrate and about half a per cent. of potassium chlorid, crystallizing out the hydrate at about 60° centigrade, and removing the crystals from the mother-liquor at a temperature not less than 35° centigrade, substantially as described.

3. The process which consists in evaporating a solution of potassium hydrate and potassium chlorid, separating the latter at a temperature of from about 15° to 20° centigrade, evaporating the remaining solution, stirring and cooling the same to about 60° centigrade, and removing the crystals formed at a temperature not less than 35° centigrade, substantially as set forth.

In testimony that I claim the foregoing as my invention I have signed my name in presence of two subscribing witnesses.

HEINRICH PRECHT.

Witnesses:
GEORGE H. MURPHY,
CARL OSTERMANN.